United States Patent [19]

Wu et al.

[11] 4,279,390

[45] Jul. 21, 1981

[54] RIBBON CARTRIDGE

[75] Inventors: Edward S. Wu, Chelmsford; Roger R. Soulard, Dracut, both of Mass.

[73] Assignee: Wang Laboratories, Inc., Lowell, Mass.

[21] Appl. No.: 86,058

[22] Filed: Oct. 18, 1979

[51] Int. Cl.[3] .......................... G03B 1/04; G11B 15/32

[52] U.S. Cl. .................................... 242/192; 242/194; 400/208

[58] Field of Search ................................ 242/192-194, 242/197; 360/96, 132; 400/196, 232, 208, 208.1; 352/156

[56] References Cited

U.S. PATENT DOCUMENTS

| | | | |
|---|---|---|---|
| 4,034,935 | 7/1977 | Plaza et al. | 242/197 |
| 4,131,374 | 12/1978 | Porterfield | 400/232 |
| 4,132,485 | 1/1979 | Hess | 400/208 |

FOREIGN PATENT DOCUMENTS

| | | | |
|---|---|---|---|
| 1575853 | 7/1969 | France | 242/194 |

*Primary Examiner*—Leonard D. Christian

[57] ABSTRACT

A printer reel-over-reel ribbon cartridge having a supply reel located above a take-up reel on the same shaft has a driven stretched elastic endless belt engaging the outer surface of the ribbon on the take-up reel for moving the ribbon from the supply reel to the take-up reel.

4 Claims, 2 Drawing Figures

FIG 1
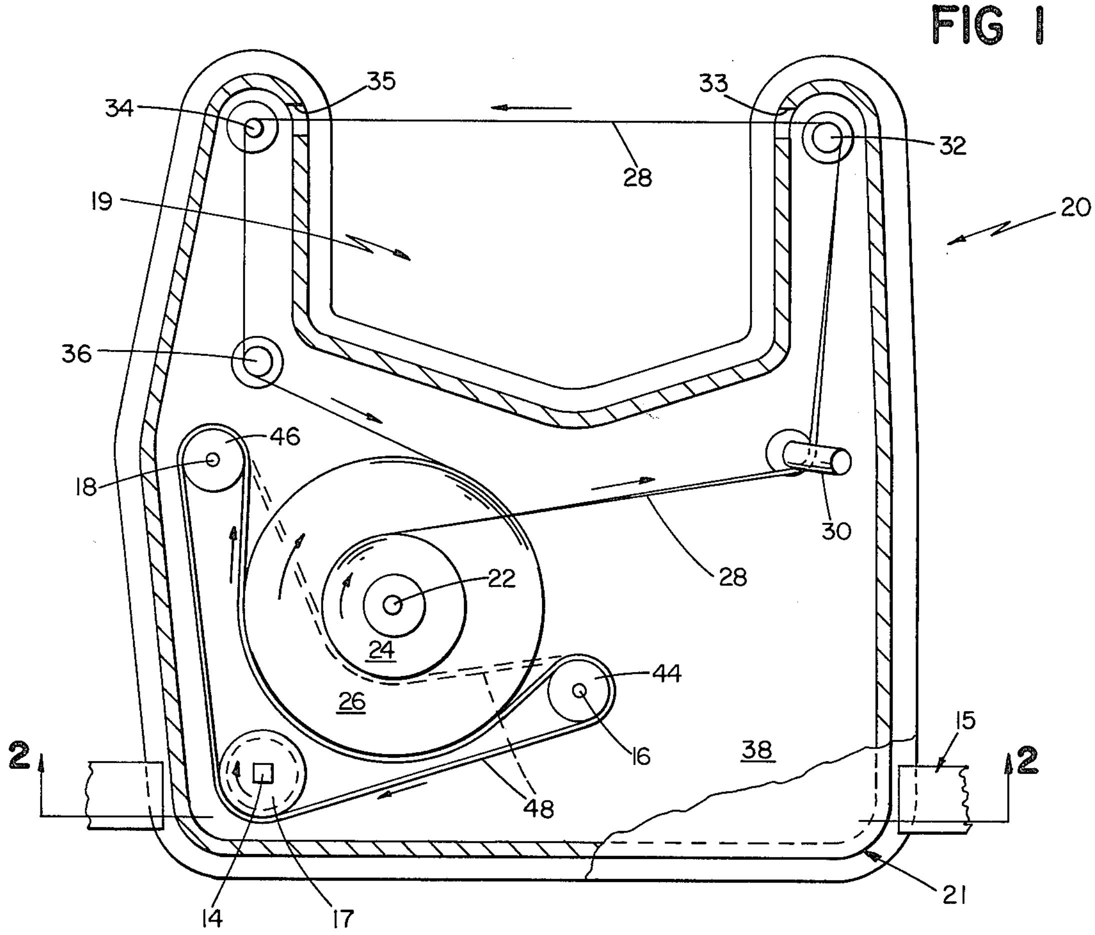
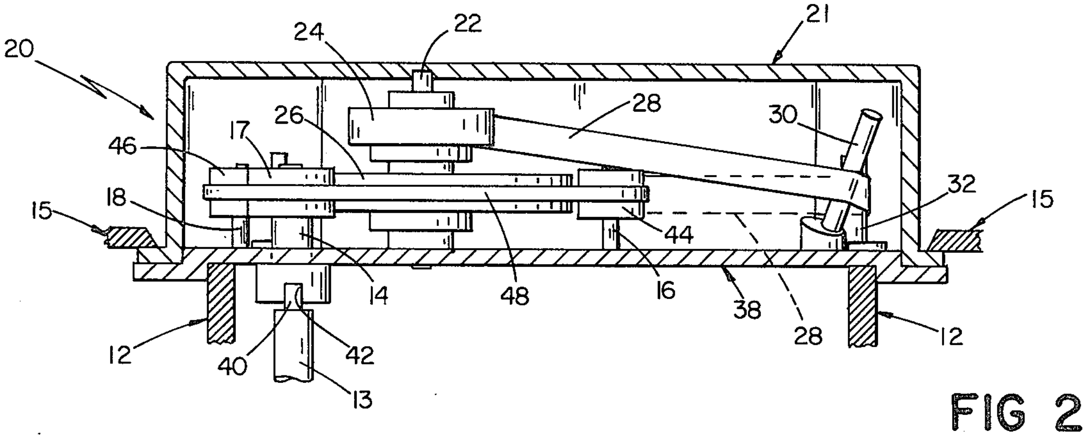
FIG 2

RIBBON CARTRIDGE

This invention relates to ribbon cartridges for printers or the like.

Ribbon cartridges of the reel-to-reel type are generally of two configurations. In one configuraton, the supply reel and the take-up reel are spaced apart horizontally in the same plane, as is disclosed, for example, in Hess, U.S. Pat. No. 4,132,485. In another configuration, the reels overlap but their axes are horizontally spaced apart, as disclosed in Plaza et al., U.S. Pat. No. 4,034,935, for example. With either configuration, the housing dimension is not efficiently utilized.

Another disadvantage of such patents is present in their driving mechanisms for moving the ribbon from the supply reel to the takeup reel. The first of the above-mentioned patents discloses a capstan device for moving the ribbon and an elastic endless belt used as a drag force on the ribbon. The ribbon moving mechanism of the second patent is a capstan assembly externally driven by an elastic O-ring for rotating the take-up reel.

In view of such deficiencies of the prior art, it is a major object of the present invention to provide a novel ribbon cartridge having improved space utilization and driving mechanisms.

It is a specific object of the present invention to minimize the dimension necessary to house the ribbon cartridge reels, or conversely, to maximize the size of the reels which may be used within a ribbon cartridge of specified dimension.

It is another specific object of the present invention to provide a simplified driving mechanism for moving the ribbon from the supply reel to the takeup reel.

Accordingly, the present invention provides a novel reel-over-reel ribbon cartridge for a printer or the like. The cartridge of the invention includes a housing having a base with a reel shaft mounted on it. A ribbon supply reel is rotatably mounted on the reel shaft for providing a supply of fresh ribbon wound thereon and a ribbon takeup reel is rotatably mounted concentrically on the reel shaft for providing a takeup of used ribbon. Ribbon guide means are provided for guiding the ribbon from the supply reel to the takeup reel. Ribbon driving means are positioned adjacent to the takeup reel and include a drive shaft rotatably mounted on the base, spaced from the reels and having a drive pulley mounted thereon in the plane of the takeup reel, a pair of idler shafts mounted on the base and having rotatable idler pulleys mounted thereon in the plane of the takeup reel, and a normally stretched tensioned elastic endless belt trained around the drive and idler pulleys. The belt engages an increasing arcuate portion of the outer surface of the ribbon on the takeup reel for moving the ribbon from the supply reel to the takeup reel in response to rotation of the drive shaft at a substantially constant rate of speed as its diameter on the takeup reel increases during use of the cartridge.

Other objects, features and advantages of the present invention will appear from the following detailed description of a preferred embodiment thereof, taken together with the accompanying drawings, wherein:

FIG. 1 is a top plan view, partly broken away, of the ribbon cartridge of the invention; and FIG. 2 is a cross-sectional view of the ribbon cartridge of FIG. 1, taken along lines 2—2 thereof.

Referring to the drawings, the ribbon cartridge of the invention is shown mounted on supporting abutments 12 of a printer, not shown, having a vertical printer drive shaft 13 having a driving lug 40 at its upper end. Releasable latches 15 are also provided on the printer for holding the ribbon cartridge in operating position.

The ribbon cartridge of the invention is of conventional external shape and includes a housing having a U-shaped recess 19 on one side with a pair of opposed ribbon openings 33 and 35 for presenting the ribbon 28 to the printing elements of the printer, not shown. Housing 20 has a flat base 38 with a flat cover 21 spaced thereabove. A fixed reel shaft 22 is mounted at its lower end in a suitable bearing in base 38 and at its upper end in a suitable bearing in cover 21 with its axis perpendicular to base 38. A ribbon supply reel 24 is rotatably mounted on reel shaft 22 adjacent cover 21 for providing a supply of fresh ribbon 28. A ribbon takeup reel 26 is also rotatably mounted on reel shaft 22 adjacent base 38 concentrically with supply reel 24 for providing a takeup of used ribbon 28. The supply reel 24 in the preferred embodiment is mounted above the takeup reel 26, although their positions could be reversed.

Ribbon 28 is guided between supply reel 24 and takeup reel 26 by an input ribbon guide shaft 30 mounted on base 38 with its axis tilted away from supply reel 24 for guiding it downwardly into the plane of takeup reel 26, a pair of ribbon guide shafts 32 and 34, each adjacent one of housing openings 33 and 35 and an output ribbon guide shaft 36 adjacent takeup reel 26.

For rotating takeup reel 26, a drive shaft 14 is rotatably mounted in a suitable bearing on base 38 with its axis perpendicular thereto. Its lower, external end is provided with a slot 42 for engagement with driving lug 40 on the upper end of printer drive shaft 13. Its upper end within housing 20 is provided with a drive pulley 17 in the plane of takeup reel 28. A pair of idler shafts 16 and 18 having rotatable idler pulleys 44 and 46 in the plane of takeup reel 26 and on opposite sides thereof are mounted on base 38 with their axes perpendicular thereto. A normally stretched, tensioned elastic endless belt 48 trained around drive pulley 17 and idler pulleys 44 and 46 and engaging an arcuate portion of the outer surface of ribbon 28 on takeup reel 26 is provided for driving takeup reel 26.

In operation, again referring to the drawings in which the ribbon 28 is shown as nearly exhausted from supply reel 24, the normally stretched tensioned elastic endless belt 48 engages an arcuate portion of the outer surface of ribbon 28 on takeup reel 26. As driving shaft 14 is rotated by printer drive shaft 13, endless belt 48 in engagement with the surface of ribbon 28 on takeup reel 26 winds ribbon 28 onto takeup reel 26 in response to the rotation of drive shaft 14. This pulls ribbon 28 from supply reel 24, around guides 30 and 32, through housing openings 33 and 35, around guides 34 and 36 and onto the surface of takeup reel 26. Endless belt 48 increases in length to engage an increasing arcuate portion of the outer surface of ribbon 28 as it winds onto takeup reel 26 during the use of the ribbon cartridge, as is shown in FIG. 1, from its dotted line initial position to its full line position and moves ribbon 28 at a substantially constant rate of speed as the diameter of ribbon 28 on takeup reel 26 increases.

What is claimed is:

1. A reel-over-reel ribbon cartridge comprising
a housing having a base
a reel shaft mounted on said base a ribbon supply reel rotatably mounted on said reel shaft for providing a supply of fresh ribbon wound thereon a ribbon takeup reel rotatably mounted on said reel shaft for providing a takeup of used ribbon ribbon guide means for guiding said ribbon from said supply reel to said takeup reel, and ribbon driving means positioned adjacent to said takeup reel including a drive shaft rotatably mounted on said base and spaced from said reels and having a drive pulley mounted thereon in the plane of said takeup reel a pair of idler shafts mounted on said base, said idler shafts having rotatable idler pulleys mounted thereon in the plane of said takeup reel, and a normally stretched tensioned elastic endless belt trained around said drive and idler pulleys and engaging an arcuate portion of the outer surface of the ribbon of said takeup reel for moving said ribbon from said supply reel to said takeup reel in response to rotation of said drive shaft, said belt engaging an increasing arcuate portion of the outer surface of said ribbon and moving said ribbon at a substantially constant rate as its diameter on said takeup reel increases during use of said cartridge.

2. The ribbon cartridge of claim 1 wherein said pair of idler shafts are on opposite sides of said drive shaft.

3. The ribbon cartridge of claim 2 wherein said ribbon guide means include at least two shafts mounted on said base, a first shaft receiving said ribbon from said supply reel having its axis tilted away from said supply reel.

4. A reel-over-reel ribbon cartridge comprising a housing having a base a reel shaft mounted on said base with its axis perpendicular thereto a ribbon supply reel rotatably mounted on said reel shaft with one side thereof adjacent said base for providing a supply of fresh ribbon wound thereon a ribbon takeup reel rotatably mounted on said reel shaft on the opposite side of said supply reel for providing a takeup of used ribbon ribbon guide means for guiding said ribbon from said supply reel to said takeup reel, said ribbon guide means including four shafts mounted on said base, a first shaft receiving said ribbon from said supply reel having its axis tilted away from said supply reel, said remaining shafts being mounted on said base with their axes perpendicular thereto, and ribbon driving means positioned adjacent to said takeup reel including a drive shaft rotatably mounted on said base with its axis perpendicular thereto and spaced from said reels and having a drive pulley mounted thereon in the plane of said takeup reel a pair of idler shafts mounted on said base with their axes perpendicular thereto and on opposite sides of said drive pulley and said takeup reel, said idler shafts having rotatable idler pulleys mounted thereon in the plane of said takeup reel, and a normally stretched tensioned elastic endless belt trained around said drive and idler pulleys and engaging an arcuate portion of the outer surfaces of the ribbon of said takeup reel for moving said ribbon from said supply reel to said takeup reel in response to rotation of said drive shaft, said belt engaging an increasing arcuate portion of the outer surface of said ribbon and moving said ribbon at a substantially constant rate as its diameter on said takeup reel increases during use of said cartridge.

* * * * *